Dec. 14, 1926.
H. A. PILLARS ET AL
1,610,313
HEADLIGHT AND HORN CONTROL SWITCH FOR MOTOR VEHICLES
Filed August 6, 1923    2 Sheets-Sheet 1
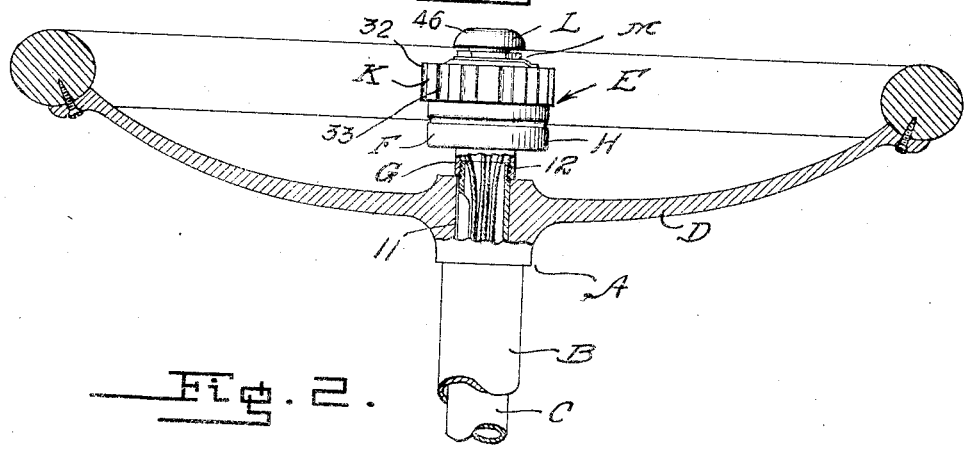
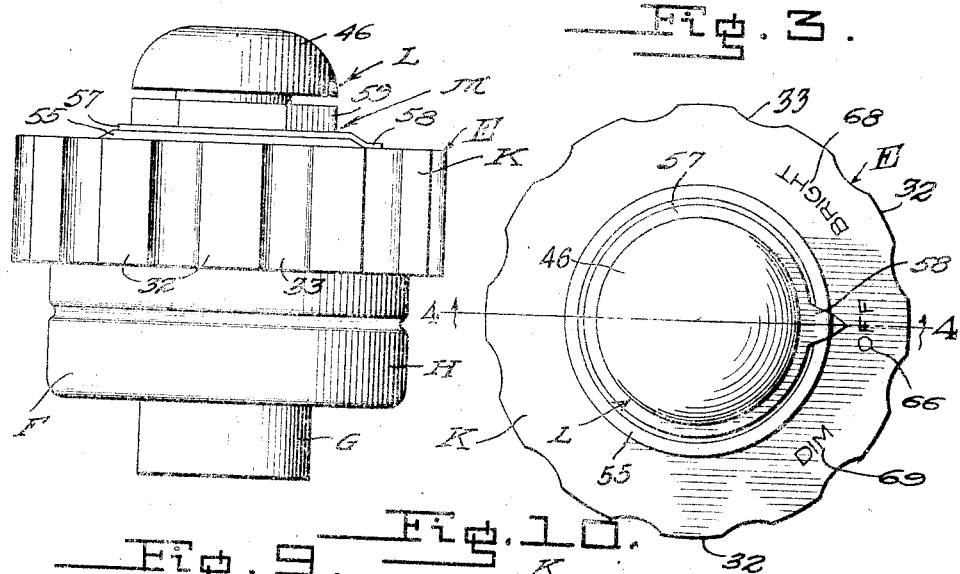
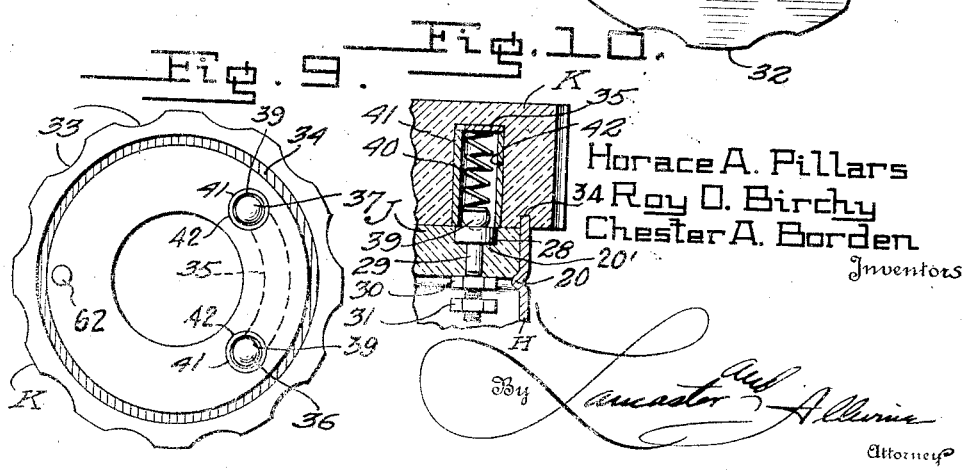
Horace A. Pillars
Roy O. Birchy
Chester A. Borden
Inventors
By Lancaster and Allwine
Attorneys Dec. 14, 1926.
H. A. PILLARS ET AL
1,610,313
HEADLIGHT AND HORN CONTROL SWITCH FOR MOTOR VEHICLES
Filed August 6, 1923    2 Sheets-Sheet 2
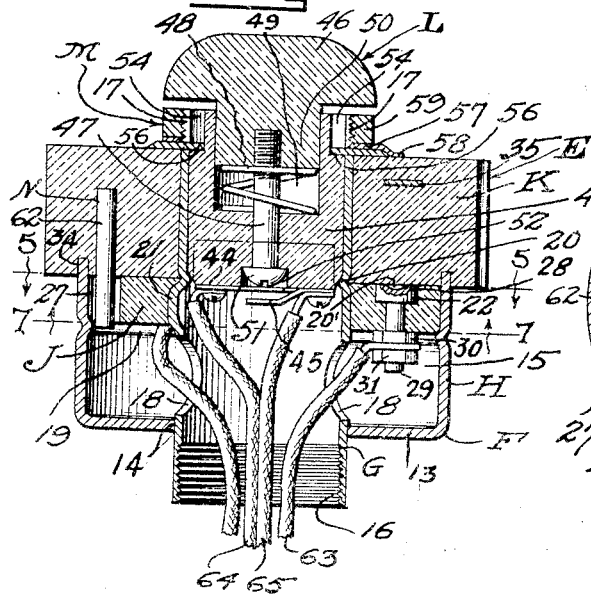
Horace A. Pillars
Roy O. Birchy
Chester A. Borden
Inventors
Attorneys Patented Dec. 14, 1926.

1,610,313

UNITED STATES PATENT OFFICE.

HORACE A. PILLARS, ROY O. BIRCHY, AND CHESTER A. BORDEN, OF JACKSONVILLE, FLORIDA.

HEADLIGHT AND HORN CONTROL SWITCH FOR MOTOR VEHICLES.

Application filed August 6, 1923. Serial No. 656,045.

The present invention relates to electric switches and more particularly to such well adapted for use on motor vehicles, for the control of electric currents through signal devices, such as electric horns and the lamps of headlights.

The principal objects of the invention are to provide switches which may be readily disposed on the steering columns of motor vehicles and so positioned that the drivers may operate same without reaching to the instrument board and thus direct the line of vision in the path of travel during operation of the switches, avoiding accidents which frequently occur when bright lights are to be rendered dim, or vice versa, and the operator is compelled to take his eyes off the road ahead to locate the switches on the instrument board; and to provide switches which are neat in appearance, inexpensive to manufacture and susceptible of adjustment to meet the conditions of individual installation.

Another object of the invention is to provide switches which will maintain the positions to which they are adjusted even though subjected to considerable vibration and which will remain in operative condition for a great length of time even though operated frequently and with considerable force.

Other objects and advantages of the invention will appear in the following detailed description, taken in connection with the accompanying drawings, forming a part of this specification, and in which drawings:

Figure 1 is a view partly in elevation and partly in section of a steering column of a motor vehicle equipped with a switch constructed according to our invention.

Figure 2 is an enlarged elevation of the switch.

Figure 3 is a plan view of the same.

Figure 4 is a vertical sectional view through the switch on the line 4—4 of Figure 3.

Figure 5 is a cross sectional view on the line 5—5 of Figure 4.

Figure 6 is a view similar to Figure 5 but showing certain parts in a different position.

Figure 7 is a sectional view on the line 7—7 of Figure 4 looking in the direction of the arrows.

Figure 8 is a plan view of an element of means for retaining part of the switch in assembled relation.

Figure 9 shows a view, on a slightly reduced scale of a rotatable contact carrying body forming a part of the switch.

Figure 10 is a fragmentary vertical sectional view through a movable and stationary member disclosed in detail.

In the drawings, where similar characters designate corresponding parts throughout the several views, A designates a steering column including an outer shell B, inner shell or shaft C and steering wheel D, keyed or otherwise secured to the shaft C; and E a switch constructed according to the present invention, and in the example shown, in screw threaded engagement with shaft C and functioning to hold the wheel D thereon.

The switch E is composed of a support F which includes inner and outer cylindrical shells G and H, respectively; stationary and rotatable contact carrying bodies J and K, respectively; a button operated switch L; means M for retaining the body K and switch L in operative relation to the support F; and a device N for limiting the amplitude of oscillation of rotatable body K.

The steering column A is merely shown by way of example, it being understood that the principle of this invention is applicable to various types of steering columns and that slight alterations of the support F may be required to adapt it to various makes of steering columns. In the example shown, the wheel D imparts movement to the shaft C, as by a key 11 and the support F functions to hold the wheel D on shaft C by having its lower portion in screw threaded engagement with the shaft C as at 12.

As to the support F the outer cylindrical shell H may be secured to the inner cylindrical shell G as by an inwardly extending flange 13 formed as a part of the outer shell, and welded or otherwise secured to the inner shell as at 14 thus providing a space 15 for the accommodation of parts of the switching bodies, wires, and so forth. The inner cylindrical shell is preferably longer than the outer cylindrical shell, so as to project below the flange 13 where, in the example shown, it is internally screw threaded as at 16. That portion of the cylindrical shell which projects above the shell H is provided, in the example shown, with two diametrically opposite notches 17 leading downwardly from its upper margin, the function of which will be hereinafter more fully set forth. It is preferred to provide transverse ways 18, affording communication between the interior of the inner shell, and the space 15 between the inner and outer shells. Other characteristics of the support F, in the example shown, are an inwardly extending circumferentially disposed rib 19, formed as a part of outer shell H, and an inwardly circumferentially disposed rib 20 formed as a part of inner shell G, and a lug 21 extending radially of the inner shell G, and formed as a part thereof, the function of these ribs and lug to be subsequently set forth.

The stationary contact carrying body J is preferably annular in shape and disposed between the inner and outer shells G and H, in the space 15, resting upon annular rib 19. In the example shown this body J is provided with five recesses 20' exposed at its upper face, equi-distant from one another, and from the axis of the annular body, the middle recess being provided with a current conductor 22 and the outer recesses with current conductors or contacts 23 and 24. The recesses between contacts 22, 23 and 24, may be provided with metallic members 25, but it is to be understood that these are not intended as current conductors, and are not electrically connected with apparatus. In the example shown, the body J is rendered stationary by the provision of a notch 26, receiving the lug 21, but in the manufacture of these switches it is preferred not to provide a notch until the switch is disposed, or being assembled in operative relation to the steering column in order that the contact 22 may be disposed relative to the position of the driver of the vehicle, when the steering mechanism is arranged for travel straight ahead, as hereinafter noted, and during installation this notch 26 may be readily made so as to accommodate the lug 21. In the example shown, the body J is also provided with an arcuate way 27, equi-distant throughout its length from the axis of the annular body, the function of this way to be subsequently set forth. The contacts 22, 23 and 24 are alike in that they each comprise a head 28 in which is provided the recess 21'; a shank 29 extending transversely through the annular body J, and nuts 30 and 31, on shank 29, the former binding the contact in place, and the latter serving to bind the conducting wire in current conducting relation with the contact.

As to the rotatable contact carrying body K, such is also preferably annular in shape, and of insulating material, having its outer periphery provided with ribs 32 and recesses 33, so that it may be readily grasped and rotated. The body K is revolvable on the inner shell G and disposed with its one face,—the lower face, confronting the upper face of annular body J. If desired, this confronting face may be provided with an annular groove 34 receiving the upper marginal portion of cylindrical shell H. A bridge piece 35 is preferably embedded in body K and provided with contacts 36 and 37 exposed at the confronting face, these contacts 36 and 37 being spaced apart a distance equal to the spacing of alternate recesses 20' in body J. In the example shown, the contacts 36 and 37 are alike inasmuch as each comprises a ball member 39, expansion spring 40 and a cylindrical guide 41 disposed in a recess 42 open to the confronting face of the body K, the bridge piece 35 being in conducting communication with the spring 40 and guide 41. As may be observed from Figure 10 of the drawings, when the bodies J and K are in opposite relation one to the other, the expansion spring 40 will urge the ball 39 into the recess 21', as body K is rotated.

With reference to the button operated switch L, such includes, in the example shown, a main body portion 43 of insulating material, disposed in inner shell G, normally spaced apart spring contact members 44 and 45, carried by body 43, a button 46 provided with a stem 47 for moving contact 44 into engagement with contact 45, and expansion spring 48, normally elevating the button 46, so that no circuit is completed through contacts 44 and 45 until the button is depressed sufficiently that the stem 47 will move contact 44 into engagement with contact 45. The body 43 is provided with a recess 49 in its upper portion accommodating the spring 48 and a reduced lower extension 50 of the button 46, which extension 50 telescopes in recess 49. The stem 47 is preferably a screw, the head 51 of which is accommodated in a recess 52 formed in the lower portion of body 43. The contacts 44 and 45 may be secured to body 43 as by screws 53. For a purpose to be subsequently set forth, the body 43 is provided with notches 54 aligned with notches 17, as clearly shown in Figure 4 of the drawings. The lower portion of body 43 rests upon the annular rib 20 of inner shell G.

Concerning the means M, such, in the example shown, comprises a washer 55 shown more in detail in Figure 8, having inwardly, diametrically disposed lugs 56, an indicator ring 57 having a radially extending pointer 58, and a nut 59 for screw threaded engagement with the exterior of the upper end portion of cylindrical shell G. In practice, the notches 17 are made sufficiently deep that when the washer 55 is disposed above annular body K, and the lugs 56 of the washer extend into notches 17 and 54, the indicator ring 57 and nut 49 cannot be turned sufficiently tight as to prevent free circumferential movement of annular body K. The lugs 56 not only hold the body 43 of the button operated switch, against circumferential movement, but also against axial movement with respect to cylindrical shell G. The indicator 58 is made separate from the washer 55 in order that this indicator may be placed to extend either laterally of the axis of the steering column, with respect to the driver of the car, as shown in Figures 1, 2, or 3, or to extend toward the driver of the car, when the steering wheel D is arranged for travel straight ahead. The operator may therefore select the position desired for this indicator 58, as hereinafter noted.

In the example shown, the device N for limiting the amplitude of oscillation of the body K, consists of a pin 62 embedded in the body K, and extending into the arcuate way 27, this pin 62 being disposed diametrically opposite to the contact 22, and the arcuate way being of a length sufficient to limit movement of the rotatable body K when either contact 36 engages contact 23, or contact 37 engages contact 24.

In practice, the contact 22 is for the current supply and has a conductor 63 connected thereto, this conductor passing through wire way 18, as shown in Figure 4 of the drawings. The contact 24 may be connected to the lamps of the headlights, so as to give bright illumination of the path of travel. The contact 23 may be connected to lamps of lower candle power, or to a resistance, so as to give a dim light in the path of travel. The contacts 44 and 45 may be connected to wires 64 and 65, in a circuit with a horn or other audible signal. Rotatable body K may be provided with delineations on its upper face, such as the word "Off", as at 66 and the word "Dim" and "Bright" as at 67 and 68, at opposite sides of the word "Off". In the example shown, when the rotatable body K is so disposed that its contacts 36 and 37 rest on metallic members 25, which are not conductively connected with wires of the lighting system, then the indicator 58 points to the word "Off" and the pin 62 is midway of the end of arcuate way 27, as shown in Figure 5, the dotted lines representing the position of the bridge piece. If the body K is rotated contra-clockwise, from the position shown in Figure 3 of the drawings, then the contacts 36 and 37 engage the contacts 22 and 23, and the pin 62 engages in one end portion of the arcuate way 27, as shown in Figure 6. This brings the current supply conductor into conducting communication with the contact 23, dimly lighting the headlights. If the body K is moved clockwise until the pin 62 engages the opposite end of way 27, then the headlights are brightly lighted.

In assemblage, the support F is first turned tight so as to function, in the example shown, to securely fasten the wheel D on the shaft C. The person installing then observes the position of the lug 21 of the inner shell G and cuts the notch 26 in the body J so that the current supply contact 22 is either directly in front of him, when the steering wheel D is arranged for travel straight ahead, if he wishes the delineations 66, 67 and 68 to be directly in front of him, or, if it is desired to have these delineations laterally, as shown in the drawings, then the notch is cut so that the current supply contact 22 is to one side of the axis of the steering column, in front of the operator, when the steering wheel D is arranged for travel straight ahead. The wires are then properly connected to the various contacts and the bodies J and K arranged with their faces, to which the contacts are disposed, in confronting relation, after which the nut 59 is turned tight, with the indicator 58 pointing to the word "Off" or, directly above the current supply contact 22.

Changes in details may be made without departing from the spirit or scope of our invention; but,

We claim:

1. A switch comprising in combination two annular bodies formed of insulating material and having central openings, a support for said bodies rendering one body stationary and the other body rotatable above said stationary body, with faces of the bodies confronting one another and their central openings axially aligned, a portion of said support being projected through the central openings of said bodies, co-acting contacts carried by said annular bodies exposed at their confronting faces and arranged for different switching combinations by movement of said movable body, a single switch disposed in the portion of the support passing through the central openings of said annular bodies and including a stationary element carried by said support and a movable element in operative relation to the stationary element, and common means for holding the stationary element of said switch rigid in the support and retaining the rotatable body in position for rotating above the stationary body in operative relation thereto.

2. In a switch, the combination of a support including inner and outer cylindrical shells disposed in spaced apart relation, the inner shell extending beyond the outer shell, an annular body of insulating material disposed between and stationary with said shells, an annular body of insulating material rotatable about the extending portion of said inner shell, and having its face confronting a face of said stationary body, and exposed with respect to said outer shell, co-operating contacts carried by said annular bodies exposed at their confronting faces and arranged for different switching combinations by movement of said movable body, and means carried by the extending portion of said inner shell for retaining said second mentioned annular body thereon.

3. In a switch, the combination of a support including inner and outer cylindrical shells disposed in spaced apart relation, the inner shell extending beyond the outer shell, said inner shell provided with transverse wire ways, communicating with the space between said inner and outer shells, an annular body of insulating material disposed between and stationary with said shells and above said wire ways, an annular body of insulating material rotatable about the extended portion of said inner shell, and having its face confronting said stationary body, and exposed with respect to said outer shell, co-acting contacts carried by said annular bodies exposed at their confronting faces and arranged for different switching combinations by movement of said movable body, and means carried by the extending portion of said inner shell for retaining said second mentioned annular body thereon.

4. A switch comprising in combination, a support including inner and outer cylindrical shells connected together in spaced apart relation, the inner shell extending beyond the upper margin of the outer shell, and provided with radial notches, two annular contact carrying bodies carried by said support, one between the shells and rigid therewith, and the other rotatable about said inner shell above said outer shell, a button operated switch including a body disposed in said inner shell and having notches aligned with the notches of said inner shell, and means carried by said inner shell including lugs extending into said notches thereof and into the notches of said button operated switch body for retaining the rotatable annular body against movement axially of said inner shell and said button operated switch body against circumferential and axial movement in said inner shell.

5. A switch comprising in combination, a support including a tubular member having radial notches provided therein, upper and lower annular contact carrying bodies carried by said support about said tubular member, the lower body being stationary and the upper body being rotatable, a button operated switch including a body disposed in said tubular member and having notches aligned with the notches of the tubular member, and means carried by said tubular member including lugs extending into said notches thereof and into the notches of the button operated switch body for retaining the rotatable contact carrying body against movement axially of said tubular member and said button operated switch body against circumferential and axial movement in the tubular member.

HORACE A. PILLARS.
ROY O. BIRCHY.
CHESTER A. BORDEN.